3,277,186
HYDROGENATED BISPHENOL A
Warn Dean Robinson, Webster Groves, Mo., and Herbert J. Moltzan, Wichita, Kans., assignors to Monsanto Chemical Company, St. Louis, Mo., a corporation of Delaware
No Drawing. Filed Apr. 23, 1962, Ser. No. 189,264
3 Claims. (Cl. 260—631)

This invention relates to 4,4'-isopropylidene-dicyclohexanol, and particularly to a new and novel physical form of this compound and means of obtaining it.

4,4'-isopropylidenedicyclohexanol, more commonly and hereinafter referred to as hydrogenated bisphenol A, is conventionally prepared by the hydrogenation of 4,4'-isopropylidenediphenol (i.e., bisphenol A. The hydrogenation is generally conducted in the presence of an active hydrogenation catalyst such as finely divided nickel, at elevated temperatures and pressures up to about 150 atmospheres. When the hydrogenation is substantially complete, the catalyst is removed by filtration. The hydrogenated bisphenol A thus obtained is poured into suitable containers and solidifies into a unitary mass upon cooling.

While pure hydrogenated bisphenol A may be prepared by using bisphenol A free of isomers and by meticulous control of the process followed by conventional purification steps, the commercial grade of hydrogenated bisphenol A contains a small amount of numerous impurities. These by-products which have no deleterious effect on the utility of hydrogenated bisphenol A, are primarily hydrogenation products of bisphenol A isomers and of phenolic intermediates. As used herein, the term "hydrogenated bisphenol A" designates this material in its commercial as well as in its pure form.

Hydrogenated bisphenol A prepared in the above manner is in the form of a tough, coalescent, amorphous, tacky glass, which conforms and adheres to the inner walls of its packaging containers. Thus the removal of hydrogenated bisphenol A from its shipping containers entails considerable time, effort and expenses as well as destruction of the container. Then, after removal from the container, the hydrogenated bisphenol A glass must be broken up into usable form. This subdivision of the material must be effected shortly prior to the introduction of the hydrogenated bisphenol A into chemical process operations. Since the amorphous glass is subject to cold flow, any appreciable delay in the utilization of the subdivided glass results in the reconsolidation of the particles into a rigid unitary mass. Thus continuous vigilance and particular caution must be exercised to prevent the freezing of bins, hoppers, weighing and conveyor systems in using this compound. While hydrogenated bisphenol A is recognized as a valuable diol intermediate in the formulation of polyesters and alkyd resins, the handling difficulties normally attendant thereto seriously detract from its generally advantageous characteristics, and render operations involving it cumbersome, time-consuming and expensive.

It is therefore an object of the present invention to provide hydrogenated bisphenol A in new and novel form overcoming the disadvantages of the prior art. A more specific object is to provide stable free-flowing particles of hydrogenated bisphenol A. Another object is to provide means for the preparation of stable free-flowing particulate hydrogenated bisphenol A.

In accordance with this invention these and other objects are achieved, generally speaking, by subjecting hydrogenated bisphenol A to heat treatment and shearing stress. More specifically this invention contemplates heating amorphous hydrogenated bisphenol A to temperatures up to about 200° C., cooling the material, and working or comminuting it by the application of a shearing, tearing or crushing force. Temperatures in excess of about 200° C. do not enhance the properties of the product. The sequence of the application of heat and of shearing stresses is not particularly important. These can be applied simultaneously or consecutively and in a number of combinations. For example, the material may be alternately heated and sheared, it may be sheared during the annealing period followed by the application of additional shear, or the heat treatment and shearing action can be substantially co-extensive.

Amorphous hydrogenated bisphenol A remains as a relatively rigid solid below about 76° C., at which point it begins to melt. At higher temperatures, it is a turbid, milk-white suspension whose consistency and turbidity are progressively reduced with increasing temperature until it forms a clear melt at about 172° C. The heat treatment can be applied with equal success to the amorphous hydrogenated bisphenol A at any temperature up to about 200° C., regardless of the physical form of the material being treated. The time required to anneal the amorphous hydrogenated bisphenol A is in part a function of the temperatures employed. Generally when the treating temperature is elevated, the time needed to effect the transformation to a free-flowing composition is materially reduced. However, it has been found that optimum operating conditions are realized at a temperature within the approximate range of 100 to 110° C. Thus, in commercial operations, it is generally preferred to utilize elevated annealing temperatures at which the hydrogenated bisphenol A is at least partially melted. The preferred operating range is therefore between about 76° C. and about 172° C., and more specifically between about 76° C. and about 110° C.

When a relatively low temperature, that is a temperature below about 76° C. is employed, the hydrogenated bisphenol A is in a completely solid form throughout the process. The procedure employed is to subdivide the material by mechanical means to an average particle size sufficiently small to pass through a 30 mesh screen before subjecting it to the heat treatment. The subdivided material is then placed in an oven at a temperature between about 35° C. and about 75° C. and preferably between about 60° C. and 65° C.

At lower temperatures within this operating range repeated heating, cooling and particle size reduction is required and the requisite heat treating periods are quite prolonged. However, the number of cycles and the duration of the heat treating periods are roughly inversely proportional to the temperature employed. Thus at temperatures below about 40° C. two or more particle size reductions followed by lengthy heat treatments may be required. However, when the temperature is increased to about 60–65°, the requisite treatment can be completed in only one cycle involving a materially shortened heating period. In any event, at the end of the terminal heating treatment, the material is readily converted to a free-flowing particulate composition which has no tendency to agglomerate or cold-flow even when subjected to temperatures as high as 40° C. and above for extended periods of time. This conversion of the material into a free-flowing composition can be accomplished in a number of ways. The material caked during the heating period can be broken up into a powder or into much larger particles by conventional means well known to the art. The particle size in itself does not contribute to the free-flowing characteristics of this material. Thus the end product can be reduced to a size best suited for the operation in which it is destined to be used. Therefore, it can be ground to a powder sufficiently fine to pass through 60 mesh, 30 mesh or even finer screens or alternately merely broken into relatively large, irregularly shaped pieces having a major dimension of an inch or more.

While the low temperature heat treatment described above does provide a satisfactory product, it is preferred to carry out the major portion of the heat treatment at such temperatures that at least a portion of the hydrogenerated bisphenol A is in a molten form. Thus in most instances it is preferred to operate primarily between about 76° C. and about 172° C. Within this range the hydrogenated bisphenol A is in the form of a slurry. During heat treatment at such elevated temperatures, it is advantageous to maintain constant agitation or shear until the hydrogenated bisphenol A has been cooled sufficiently to form a thick, pourable slurry. It is believed that agitation imparts a shearing or tearing action to the fluid material so as to encourage some type of phase change and at least partial crystallization of the hydrogenated bisphenol A.

Alternately a combination of the two general procedures described above may be employed. When such a combination process is utilized, molten hydrogenated bisphenol A at an elevated temperature, say of approximately 155° C. or higher, is gradually cooled with constant agitation to a temperature in the neighborhood of 120 to 125° C. When this temperature is attained, the material in the form of a heavy slurry is poured and allowed to solidify in relatively shallow containers. These containers and their contents are then cooled to about 60–65° C. and maintained within this temperature range for periods extending from about 2 hours to one day. Subsequently the hydrogenated bisphenol A is cooled approximately to room temperature and broken into particles of the desired size.

After this compound has been heat treated in either the solid or the fluid state, it is cooled to approximately room temperature and in any event at least below about 35° C. This cooling can be effected in any convenient manner. It can be cooled gradually. However, when a more rapid treatment is desired, cooling can be accelerated by the utilization of cooling coils, the addition of Dry Ice, the application of cool air or by any other conventional cooling means.

The cooled material obtained in accordance with any of the above procedures can be comminuted or reduced to any preferred particle size by means of conventional methods or apparatus. For example, various types of crushing or attrition mills may be used to obtain a relatively finely divided product whereas larger particles can be obtained by subjecting the cooled material to less severe breaking conditions.

The heat treatment and comminution can be executed in separate pieces of apparatus or these two operations can be carried out consecutively or concurrently in the same apparatus. In fact, when the process entails heating hydrogenated bisphenol A above its melting point, the agitation of the molten or semi-molten material can be continued throughout and subsequent to the cooling operation so as to provide the requisite comminution. Several types of conventional processing equipment are adaptable for carrying out this modification of the present invention. For example, ribbon blenders, Sigma blade mixers, various types of kneaders, vacuum pan dryers and the like can be employed in this capacity.

The process is particularly well adapted to continuous operation. When the operation is continuous, the material can be continuously conveyed from the heat treating and mixing vessel to a cooling chamber and thence to any conventional crushing or comminution apparatus. Also the entire process can be carried out in combination apparatus capable of continuously mixing, cooling, extruding and pelletizing the material. While most modifications of the present invention involve comminution of the heat treated hydrogenated bisphenol A, it has been found that any mechanical working of the material which exerts a shearing stress on the heat treated compound serves to promote its conversion to a more free-flowing substance. Thus hydrogenated bisphenol A, after heat treatment at temperatures of about 76° C. and above, can be cooled and extruded by the application of pressure while at least a portion of the material is at a sufficiently high temperature to insure the formation of a cohesive body. The extruded material is then subdivided into pellets with standard type pelletizing knives or the equivalent.

When amorphous hydrogenated bisphenol A is heat treated and then subjected to mechanical work in accordance with the procedures set forth above, the resultant quasi-crystalline material in particulate form is no longer tacky and shows no tendency to coalesce or to cold-flow into a solid mass. The material thus treated will remain in this free-flowing form practically indefinitely even when exposed to temperatures in the area of 45° C. which is well above temperatures normally encountered in shipping or storage. Thus the hydrogenated biphenol A of the present invention is admirably adaptable for conventional chemical processing.

The invention and the manner in which it accomplishes its objects will be more readily understood by reference to the following detailed description of preferred embodiments thereof. In these examples and throughout the specification all proportions are expressed in parts by weight unless otherwise indicated.

*Example 1*

A quantity of hydrogenated bisphenol A obtained as a molten product from the hydrogenation of bisphenol A as described above was introduced into a suitable mixing vessel and cooled from its temperature of about 155° C. to a temperature within the range of about 115° to 125° C. The molten material was maintained within the latter temperature range for about 2 hours with continuous efficient agitation. During this period the hydrogenated bisphenol A was partially crystallized so as to form a slurry of precipitated hydrogenated bisphenol A in the molten material. This fluid milk-white slurry was then transferred to shallow trays about 3 inches deep wherein it was allowed to cool to a temperature within the range of about 60° to 65° C. The heat treatment was continued at this temperature for approximately 24 hours. At this temperature the hydrogenated bisphenol A is in the form of a rather friable solid. At the end of the 24 hour period the hydrogenated bisphenol A being treated was cooled to room temperature. The cooled material was then removed from the trays and pulverized so that substantially all of it passed through a 30 mesh screen. The material thus obtained was a tack-free, astatic, free-flowing white powder readily adaptable for conventional packaging and subsequent chemical processing.

*Example 2*

A molten charge of hydrogenated bisphenol A obtained by the hydrogenation of bisphenol A was cooled from about 155° C. to a temperature between about 115 and 125° C., and maintained within the temperature range for approximately 2 hours with thorough agitation to provide partial crystallization in the manner described in accordance with Example 1. At the end of the partial crystallization period the hydrogenated bisphenol A in the form of a molten slurry was cooled to about 105–110° C. and introduced into a reciprocal screw type continuous kneader. During its passage through the kneader this compound was cooled to about 65–70° C. which is slightly below the point at which substantially all of the material normally solidifies. The material in this condition was passed immediately from the kneader into an extrusion head having cylindrical orifices about 0.1 inch in diameter, a conventional screw-type feed, and a pelletizing knife. Upon its emergence from the extrusion orifice, the hydrogenated bisphenol A was cut into lengths of approximately ⅛ inch. Thus pellets having a diameter of about 0.1 inch and a length of about ⅛ inch were obtained. These pellets were immediately exposed to a stream of cool air so as to at least case harden them and to eliminate any tendency for them to cohere. The resultant pellets are then in condition for packaging or for introduction into any desired chemical process.

While in the above embodiment the material from the kneader was pelletized, it will be readily appreciated that the hydrogenated bisphenol A treated in this manner can be collected, cooled and then pulverized to obtain a free-flowing powder of the type described in accordance with Example 1.

*Example 3*

Another quantity of molten hydrogenated bisphenol A prepared by the above hydrogenation process was introduced directly into a Sigma blade double arm mixer at a temperature of about 155° C. The mixer was run continuously while its charge was being cooled to a temperature within the range of 90° to 100° C. in approximately 30 minutes. At this stage of the operation the hydrogenated bisphenol A in the form of soft lumpy material was transferred to shallow trays about 3 inches deep and cooled to room temperature. When completely cooled, this compound was in the form of a rather brittle, hard solid. This substance was removed from the trays and pulverized in the manner set forth in Example 1 to obtain a stable free-flowing powder substantially all of which was sufficiently fine to pass through a 30 mesh screen.

In order to illustrate the advantages of the free-flowing hydrogenated bisphenol A prepared in accordance with the present invention, this material was tested for lengthy periods at elevated temperatures together with amorphous hydrogenated bisphenol A that had merely been ground to the desired particle size. In carrying out these tests a series of samples of the free-flowing hydrogenated bisphenol A made in accordance with each of the above examples was stored for about 80 days at a temperature of approximately 40° C. As a control, comminuted glassy hydrogenated bisphenol A was also subjected to the same series of tests. At the end of the 80 day period the samples were cooled to room temperature and examined for their free-flowing characteristics. The samples of hydrogenated bisphenol A made in accordance with Examples 1 through 3 showed little if any tendency to coalesce or cold-flow. These samples maintained their original particulate or pelletized form and could be readily poured from the containers. By contrast the samples of hydrogenated bisphenol A glass that had been reduced to powder form without heat treatment had coalesced into solid unitary masses that could not be removed without destruction of its container.

The expression "free-flowing" is used herein in accordance with common usage to designate a solid particulate material which does not adhere to adjacent particles nor to other materials in contact with it. Thus this term denotes a body which will readily flow in response to gravity and to other physical stimuli.

The term "stable" refers to geometric or dimensional stability. Thus it connotes a substance capable of maintaining its original configuration and external dimensions.

Since various modifications in the specific embodiments which have been described can be made within the spirit and scope of the invention, the detailed description thereof is not to be considered as limitative except in the light of the appended claims.

The embodiments of the invention in which an exclusive property or privilege is claimed are defined as follows:

1. A process for the preparation of hydrogenated bisphenol A in the form of a stable free-flowing material which comprises
   heat treating amorphous hydrogenated bisphenol A at a temperature between 76° C. and its decomposition point,
   subjecting the hydrogenated bisphenol A to a shearing stress and cooling the hydrogenated bisphenol A to about room temperature.

2. A process for the preparation of hydrogenated bisphenol A in the form of a stable free-flowing material which comprises
   community amorphous hydrogenated bisphenol A glass,
   heating the comminuted glass to a temperature between about 76° C. and its melting point whereby the hydrogenated bisphenol A is transformed into a coalesced mass,
   comminuting the coalesced mass, cooling the hydrogenated bisphenol A to about room temperature, and
   alternately coalescing, cooling, and comminuting the hydrogenated bisphenol A until a stable free-flowing product is obtained.

3. A process for the preparation of solid, free-flowing hydrogenated bisphenol A which comprises
   heating amorphous hydrogenated bisphenol A to a temperature above its solidification point and below its decomposition point,
   cooling the hydrogenated bisphenol A to a temperature below its solidification point while applying shearing stresses thereto,
   subdividing the solidified hydrogenated bisphenol A, and
   cooling the hydrogenated bisphenol A to about room temperature.

References Cited by the Examiner

UNITED STATES PATENTS

| | | | |
|---|---|---|---|
| 2,118,954 | 5/1938 | Thomas | 260—631 |
| 2,828,278 | 3/1958 | Kosmin | 260—617 |

LEON ZITVER, *Primary Examiner.*

M. B. ROBERTO, T. G. DILLAHUNTY,
*Assistant Examiners.*